United States Patent
Hayhurst et al.

[11] 3,750,227
[45] Aug. 7, 1973

[54] WINDSHIELD WIPER CLIP ASSEMBLIES

[76] Inventors: George Hayhurst, 4180 Willowdown Rd., Oakville, Ontario; Eric Moran, 2173 Mount Forest Dr., Burlington, Ontario, both of Canada

[22] Filed: Oct. 26, 1971

[21] Appl. No.: 192,428

[52] U.S. Cl. ...... 15/250.32, 15/250.42, 287/53 WA
[51] Int. Cl. ............................................ B60s 1/40
[58] Field of Search .................. 15/250.32, 250.42, 15/250.31, 250.34; 287/53 R, 53 WA, 53 H; 85/8.8; 24/255

[56] References Cited
UNITED STATES PATENTS

| | | | |
|---|---|---|---|
| 2,073,957 | 3/1937 | Brouwer | 287/DIG. 7 |
| 2,252,855 | 8/1941 | Lasch | 287/53 H |
| 2,560,780 | 7/1951 | Sacchini | 15/250.32 X |
| 2,574,330 | 11/1951 | Judd | 287/53 H |
| 2,586,096 | 2/1952 | Schaal | 287/53 WA |
| 2,670,227 | 2/1954 | Green | 287/53 H |
| 3,378,874 | 4/1968 | Scinta | 15/250.32 |
| 3,588,941 | 6/1971 | Schlesinger | 15/250.32 |
| 3,641,614 | 2/1972 | Newsome | 15/250.32 |

*Primary Examiner*—Peter Feldman
*Attorney*—Stanley J. Rogers

[57] ABSTRACT

A windshield wiper clip assembly especially suited for side arm windshield wipers employs a U-shaped wire retaining member accommodated in a slot in the wiper body, one arm of the retaining member being corrugated and provided with a transverse pointed end to retain it in the slot, while the other end is curved to engage a retaining slot in a wiper arm pivot pin inserted in a bore in the wiper body.

7 Claims, 4 Drawing Figures

PATENTED AUG 7 1973 3,750,227
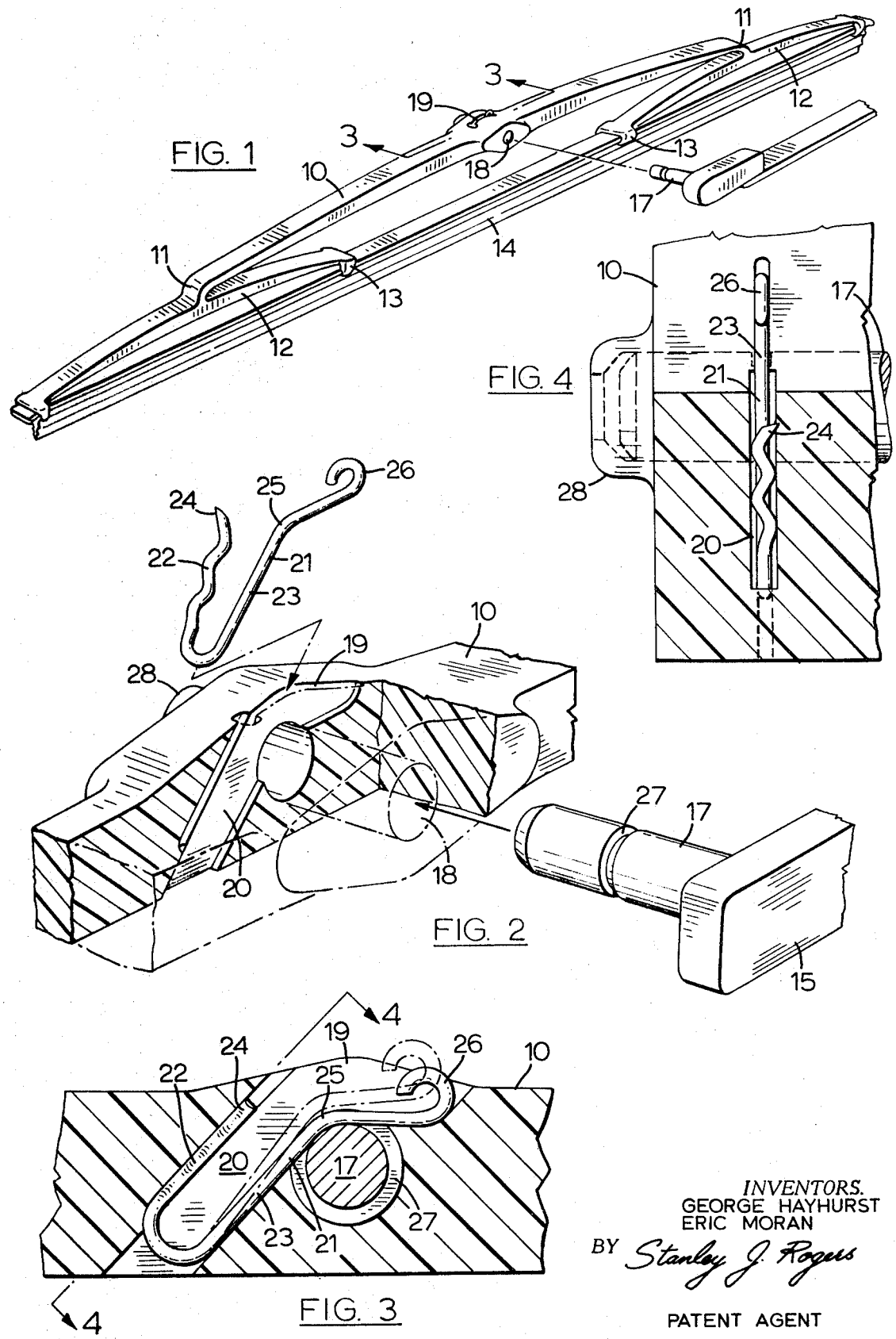
INVENTORS.
GEORGE HAYHURST
ERIC MORAN
BY Stanley J. Rogers
PATENT AGENT

WINDSHIELD WIPER CLIP ASSEMBLIES

FIELD OF THE INVENTION

This invention relates to improvements in windshield wiper clip assemblies employed for connecting a windshield wiper to a motor-operated arm by which the wiper is moved across a windshield.

SUMMARY OF THE INVENTION

The principal object of the invention is to provide a new clip assembly of simple and inexpensive form especially suited for manufacture principally by plastic moulding.

It is another object to provide such an assembly especially adapted for manufacture integrally with a windshield wiper produced by moulding from plastic material.

It is a further object of the invention to provide such a windshield wiper clip assembly which is particularly adapted for use in conjunction with an arm and wiper combination of the so-called side-pin mounting type, such a combination being employed when it is desired to provide a low silhouette and to permit the wiper in parked position to be concealed in a cowl slot of the vehicle.

In accordance with the present invention there is provided a windshield wiper clip assembly for the detachable attachment of a windshield wiper to a wiper arm, the assembly comprising a clip body, a bore in the body for the reception therein of a wiper arm pin upon which the clip body can pivot about a corresponding axis, the pin having an intermediate portion providing at least one corresponding radially-extending retaining shoulder, a slot in the clip body positioned to register with the said intermediate portion of a pin engaged in the bore, and a U-shaped retaining member mounted in the slot, the retaining member having one arm thereof engaged with at least one slot wall thereof, and being provided at its free end with a transversely extending point engaging a slot wall to oppose withdrawal of the retaining member from the slot, the retaining member having a portion of the other arm thereof protrudable into the bore for engagement with the said retaining shoulder to prevent axial movement of the pin out of the bore, and having another portion of the said other arm extending from the slot for engagement by an operator for disengagement of the retaining member from the said retaining shoulder.

Also in accordance with this invention there is provided a windshield wiper clip assembly for the detachable attachment of a windshield wiper to a wiper arm, the assembly comprising a clip body, a bore in the body for the reception therein of a wiper arm pin upon which the clip body can pivot about a corresponding axis, the pin having an intermediate portion providing at least one corresponding radially-extending retaining shoulder, a slot in the clip body positioned to register with the said intermediate portion of a pin engaged in the bore, and a U-shaped retaining member mounted in the slot, the retaining member having one arm thereof engaged with at least one slot wall thereof, and having a portion of the other arm thereof protrudable into the bore for engagement with the said retaining shoulder to prevent axial movement of the pin out of the bore, the arms of the retaining member being biased apart by their own resilience and being forced toward each other in the slot against such resilience by insertion of the wiper arm pin into the clip body bore, the resilience maintaining the said engagement of the arm portion with the retaining shoulder, the said other arm of the retaining member having another portion thereof extending from the slot for engagement by an operator for disengagement of the retaining member from the said retaining shoulder.

DESCRIPTION OF THE DRAWINGS

A particular preferred embodiment of the invention will now be described, by way of example, with reference to the accompanying drawing, wherein FIG. 1 is a general perspective view showing a windshield wiper of the invention, FIG. 2 is a perspective view to a larger scale of the center portion of the wiper of FIG. 1, with part thereof shown broken away to reveal the interior construction, and showing a wiper arm pin member ready for insertion in the clip assembly body.

FIG. 3 is a section taken on the line 3—3 of FIG. 2, and

FIG. 4 is a section taken on the line 4—4 of FIG. 3.

DESCRIPTION OF THE PREFERRED EMBODIMENTS

The windshield wiper and arm combination illustrated herein is of the so-called side-pin mounting type, wherein the arm and the wiper entered side by side as much as possible, thereby providing a low silhouette facilitating the parking of the wiper in a concealed cowl slot of the vehicle. The wiper comprises a superstructure including an elongated main backing member 10 connected at its ends by junctions 11 to subsidiary yoke arms 12, each yoke arm being provided at its two ends with opposed pairs of claws 13 which embrace and retain a squeegee assembly 14. The backing member 10, the junctions 11 and the subsidiary members 12 are formed integrally with one another by a moulding operation, and for further details of the design and construction thereof reference may be made to our Letters U.S. Pat. Ser. Nos. 3,176,337 and 3,408,680.

The wiper is supported for movement to and fro across the surface of a windshield by means of an arm 15, which is connected to the usual drive mechanism; such mechanism does not form part of the present invention and therefore is not illustrated herein. The free end of the wiper arm is provided with a projecting circular cross-section pivot pin 17, the pin being insertable with minimum play in a bore 18 in the superstructure 10, which bore is located approximately centrally of the length of the superstructure. The bore is also located approximately centrally with regard to the side profile of the superstructure which is of increased thickness at this point to provide the necessary strength and security.

The upper face of the superstructure, i.e. the face which in operation is further from the windshield, has a narrow opening 19 therein elongated in the direction of the length of the backing member, formed by a narrow slot 20 in the superstructure. The slot 20 is generally of inverted L-shape with the "vertical" leg extending from the upper to the lower face of the backing member, while the horizontal leg extends parallel to the upper face. The junction of the two legs intersects the bore 18, so that a U-shaped retaining member 21 accomodated in the slot protrudes into the bore. The part of the vertical leg further from the bore 18 is wider than the remainder of the slot. The U-shaped retaining member is in this embodiment formed from wire with a shorter arm 22 and a longer arm 23. The shorter arm 22 is corrugated along its length and its free end is formed as a transversely-extending sharp point 24. The longer arm 23 is bent smoothly about a radius in a plane containing the two arms to provide a curved pin-engaging portion 25, while its free end 26 is bent to the form of a loop for ease of engagement and handling by the hand of an operator.

The clip is very simply assembled by pushing the closed end of the retainer member into the slot 20, the corrugated shorter arm 22 entering the wiper portion of the slot and being retained therein against movement longitudinally of the backing member into the remainder of the slot. Because of its corrugated shape the arm has a high friction engagement with the slot walls. Moreover, any attempt to withdraw the member from the slot after insertion therein causes the point 24 to dig into one of the walls and prevent such movement. The arms may also be preset during manufacture inclined at a slight angle away from one another, so that they must be sprung together as they are inserted in the slot. Once in position the curved pin-engaging portion 25 protrudes into the bore, and is displaced against the bias provided by its own resilience as the pin is inserted into the bore. Thereafter the portion 25 snaps under its own resilience into a reduced diameter intermediate portion 27 of the pin, which is arranged to register with the slot when the pin is fully home in the bore. The pin is now retained axially securely in the bore by the engagement of the portion 25 with the radial retaining shoulders formed by the said intermediate pin portion 27. A boss 28 is provided on one side of the superstructure 10 surrounding the bore 18 to ensure that the operator cannot mount the wiper incorrectly on the arm. At any time the pin can be released from the bore for removal of the wiper from the arm by the operator lifting the looped end of the retaining member until the portion 25 is disengaged from the pin radial shoulders.

It will be seen that a particularly simple and effective clip assembly has been provided having a minimum of moving parts and especially adapted for use with a wiper produced by moulding from plastic material, in that the slot 20 can be produced by the moulding operation, and no further manufacture is required apart from the fabrication of the pin and its simple insertion into the slot.

Although the clip assembly of the invention has been described as an integral part of the wiper, it is also possible for it to be formed as a separate member which is attached in some way to the remainder of the wiper, for example as shown in our U.S. Pat. Ser. No. 3,176,337 and Ser. No. 3,408,680.

We claim:

1. A windshield wiper clip assembly for the detachable attachment of a windshield wiper to a wiper arm, the assembly comprising a clip body, a bore in the body for the reception therein of a wiper arm pin upon which the clip body can pivot about a corresponding axis, the pin having an intermediate portion providing at least one corresponding radially-extending retaining shoulder, a slot in the clip body positioned to register with the said intermediate portion of a pin engaged in the bore, and a U-shaped retaining member mounted in the slot, the retaining member having one arm thereof engaged with at least one slot wall thereof, and being provided at its free end with a transversely extending point engaging a slot wall to oppose withdrawal of the retaining member from the slot, the retaining member having a portion of the other arm thereof protrudable into the bore for engagement with the said retaining shoulder to prevent axial movement of the pin out of the bore, and having another portion of the said other arm extending from the slot for engagement by an operator for disengagement of the retaining member from the said retaining shoulder.

2. The invention as claimed in claim 1, wherein the said one arm is frictionally engaged in the slot and is corrugated along its length to increase its frictional engagement with the walls of the slot.

3. The invention as claimed in claim 1, wherein the said one arm is frictionally engaged in the slot and is corrugated along its length to increase its frictional engagement with the walls of the slot, the portion of the said other arm protruding into the slot being curved to substantially the same radius as the intermediate portion of the pin engaged thereby.

4. The invention as claimed in claim 1, wherein the said one arm is frictionally engaged in the slot and is corrugated along its length to increase its frictional engagement with the walls of the slot, the portion of the said other arm protruding into the slot being curved to substantially the same radius as the intermediate portion of the pin engaged thereby, and the free end of the said other arm extending from the slot being looped for manipulation by an operator.

5. A windshield wiper clip assembly for the detachable attachment of a windshield wiper to a wiper arm, the assembly comprising a clip body, a bore in the body for the reception therein of a wiper arm pin upon which the clip body can pivot about a corresponding axis, the pin having an intermediate portion providing at least one corresponding radially-extending retaining shoulder, a slot in the clip body positioned to register with the said intermediate portion of a pin engaged in the bore, and a U-shaped retaining member mounted in the slot, the retaining member having one arm thereof engaged with at least one slot wall thereof, and having a portion of the other arm thereof protrudable into the bore for engagement with the said retaining shoulder to prevent axial movement of the pin out of the bore, the arms of the retaining member being biased apart by their own resilience and being forced toward each other in the slot against such resilience by insertion of the wiper arm pin into the clip body bore, the resilience maintaining the said engagement of the arm portion with the retaining shoulder, the said other arm of the retaining member having another portion thereof extending from the slot for engagement by an operator for disengagement of the retaining member from the said retaining shoulder.

6. The invention as claimed in claim 5, wherein the free end of the said other arm extending from the slot is looped for manipulation by an operator.

7. The invention as claimed in claim 5, wherein the arms of the retaining member are forced toward each other against the said resilience by insertion of the clip member in the slot.

* * * * *

UNITED STATES PATENT OFFICE
CERTIFICATE OF CORRECTION

Patent No. 3,750,227   Dated August 7, 1973

Inventor(s) George Hayhurst et al.

It is certified that error appears in the above-identified patent and that said Letters Patent are hereby corrected as shown below:

On the cover sheet insert -- [73] Assigne: Tridon Limited, Burlington, Ontario, Canada --.

Signed and sealed this 8th day of January 1974.

(SEAL)
Attest:

EDWARD M. FLETCHER, JR.
Attesting Officer

RENE D. TEGTMEYER
Acting Commissioner of Patents